US008222867B2

(12) United States Patent
Wang et al.

(10) Patent No.: US 8,222,867 B2
(45) Date of Patent: Jul. 17, 2012

(54) BATTERY CHARGING AND DISCHARGING APPARATUS AND METHOD

(75) Inventors: Yao-Nan Wang, Taoyuan Hsien (TW); Wen-Chieh Wu, Taoyuan Hsien (TW); Chao-Hsu Chen, Taoyuan Hsien (TW)

(73) Assignee: Chroma Ate Inc., Taoyuan Hsien (TW)

( * ) Notice: Subject to any disclaimer, the term of this patent is extended or adjusted under 35 U.S.C. 154(b) by 361 days.

(21) Appl. No.: 12/702,299

(22) Filed: Feb. 9, 2010

(65) Prior Publication Data
US 2010/0201324 A1 Aug. 12, 2010

(30) Foreign Application Priority Data
Feb. 10, 2009 (TW) .............................. 98104236 A

(51) Int. Cl.
H02J 7/00 (2006.01)
H02J 7/04 (2006.01)
(52) U.S. Cl. ..................... 320/134; 320/136; 320/162
(58) Field of Classification Search .................. 320/134, 320/136
See application file for complete search history.

(56) References Cited

U.S. PATENT DOCUMENTS

| 6,127,808 A * | 10/2000 | Sudo et al. ............... 320/134 |
| 6,268,715 B1 * | 7/2001 | Oglesbee et al. ............ 320/156 |
| 6,329,796 B1 * | 12/2001 | Popescu ..................... 320/134 |
| 6,396,246 B2 * | 5/2002 | Haraguchi et al. .......... 320/134 |
| 2006/0076934 A1 * | 4/2006 | Ogata et al. ............... 320/136 |

FOREIGN PATENT DOCUMENTS

| JP | 6-253467 | 9/1994 |
| JP | 11326473 A | 11/1999 |
| JP | 2003204631 A | 7/2003 |

* cited by examiner

Primary Examiner — M'Baye Diao

(57) ABSTRACT

The invention provides a battery charging and discharging apparatus and method. The battery charging and discharging apparatus comprises a power source and a plurality of charging and discharging module. The charging and discharging module comprises a current-limiting transistor, a current-limiting resistor, a charging controlling unit, and a discharging controlling unit, wherein both the charging controlling unit and the discharging controlling unit are of battery voltage tracking types. When the charging and discharging module charges a battery, the voltage across two ends of the current-limiting transistor and the current-limiting resistor connected in series is limited to a fixed value by the charging controlling unit. When the battery discharges, the voltage across two ends of the current-limiting transistor and the current-limiting resistor connected in series is limited to a fixed value by the discharging controlling unit. Besides, the discharging controlling unit feedbacks the discharging energy from the battery to the power source.

15 Claims, 6 Drawing Sheets

BATTERY CHARGING AND DISCHARGING APPARATUS AND METHOD

BACKGROUND OF THE INVENTION

1. Field of the Invention

The present invention relates to charging and discharging of a battery and, more particularly, to a battery charging and discharging apparatus and a battery charging and discharging method which effectively reduce heat loss arising during charging and discharging of the battery and achieve recycling of the direct-current (DC) power.

2. Description of the Prior Art

In recent years, as the technology evolves constantly, there are often a wide variety of computer equipments available in the market. Among these computer equipments, notebooks not only gradually become the mainstream in the market, but also become one of the indispensable tools for people in the modern life due to a small size, easy to carry, small occupied space, etc.

In general, it usually requires a number of cells in series to provide the required voltage for notebooks in the battery-powered mode. In the battery manufacturing process, the testing in the charging and discharging of the battery must be carried on to ensure that the battery capacity meets the required specifications.

However, when the traditional charging and discharging measuring equipment examines the charging and discharging of the battery, it tends to cause large amount of heat loss, and the energy usage is not ideal enough. Please refer to FIG. 1 which illustrates a schematic diagram of the charging and discharging circuit of the traditional charging and discharging measuring equipment for charging of a battery B.

As shown in FIG. 1, the charging and discharging circuit includes a constant voltage/constant current controlling transistor Q, a current-limiting resistor R4, a constant voltage controlling integrated circuit U1, a constant current controlling integrated circuit U2, a current readback amplifier U3, and a voltage readback amplifier U4. Vs is the maximum charging voltage for the battery B; Is is the maximum charging current for the battery B; Vcc is the primary power supply for charging. Because the charging and discharging circuit of the traditional charging and discharging measuring equipment is of a voltage-fixed type, the constant voltage/constant current controlling transistor Q has considerable heat loss in the beginning of the constant current charging for the battery B by the charging and discharging circuit.

In addition, during discharging of the battery B activated by the traditional charging and discharging measuring equipment, because an electronic load circuit is introduced mostly to consume the discharging energy from the battery B directly, the charging and discharging measuring equipment will have large amount of heat loss, causing the poor energy usage and even failure to meet the increasingly stringent safety regulations.

In order to achieve the testing conditions for charging and discharging of the battery prescribed by the safety regulations, although being able to recycle the discharging energy, some charging and discharging measuring equipments often convert the discharging energy into an alternating current and then feedbacks it to the DC power system. In this way, because the feedbacked alternating current causes the original power quality factor to reduce easily, the kindness of recycling of the discharging energy is greatly reduced instead.

Accordingly, the main scope of the invention is to provide a battery charging and discharging apparatus and a battery charging and discharging method to solve the aforementioned problems.

SUMMARY OF THE INVENTION

One scope of the invention is to provide a battery charging and discharging apparatus. According to an embodiment of the invention, the battery charging and discharging apparatus includes a power source and plural charging and discharging modules for charging and discharging plural batteries respectively. Each charging and discharging module includes a current-limiting transistor, a current-limiting resistor, a charging controlling unit and a discharging controlling unit, wherein both the charging controlling unit and the discharging controlling unit are of battery voltage tracking types.

In this embodiment, when the charging and discharging module charges the battery, the voltage across two ends of the current-limiting transistor and the current-limiting resistor connected in series is limited to a fixed value by the charging controlling unit to reduce heat loss arising from the current-limiting transistor. When the battery discharges, the voltage across two ends of the current-limiting transistor and the current-limiting resistor connected in series is limited to a fixed value by the discharging controlling unit. Besides, the discharging controlling unit feedbacks the discharging energy from the battery to a direct-current (DC) power source.

Another scope of the invention is to provide a battery charging method. According to an embodiment of the invention, the battery charging method of the invention is implemented by charging a battery through a charging module which is of a battery voltage tracking type and includes a current-limiting transistor and a current-limiting resistor connected in series. When the charging module charges the battery, the method is implemented to limit the voltage across two ends of the current-limiting transistor and the current-limiting resistor connected in series to a fixed value to reduce heat loss arising from the current-limiting transistor.

Still another scope of the invention is to provide a battery discharging method. According to an embodiment of the invention, the battery discharging method of the invention is implemented by controlling a battery to discharge through a discharging module which is of a battery voltage tracking type and includes a current-limiting transistor and a current-limiting resistor connected in series. When the discharging module controls the battery to discharge, the method is implemented to limit the voltage across two ends of the current-limiting transistor and the current-limiting resistor connected in series to a fixed value to reduce heat loss arising from the current-limiting transistor. In addition, the method is implemented to further feedback the discharging energy from the battery to a power source in a direct current, wherein the power source is a direct-current power supply.

Compared to the prior art, the battery charging and discharging apparatus of the invention utilizes the charging controlling unit and the discharging controlling unit of battery voltage tracking types to limit the voltage across two ends of the current-limiting transistor and the current-limiting resistor connected in series to a fixed value to reduce heat loss arising from the current-limiting transistor during charging and discharging of the battery. Moreover, the battery charging and discharging apparatus of the invention is able to feedback the discharging energy from the battery to a DC power system in a direct current to supply the charging of other batteries. Thereby, the invention not only improves the efficiency of energy utilization, but also meets the safety regulations for the recycling of discharging energy of batteries to comply with the current trend of the environmental protection and energy conservation promoted globally.

The advantage and spirit of the invention may be understood by the following recitations together with the appended drawings.

BRIEF DESCRIPTION OF THE APPENDED DRAWINGS

DETAILED DESCRIPTION OF THE INVENTION

It is a battery charging and discharging apparatus in a first embodiment of the invention. In practice, the battery charging and discharging apparatus may be, but not limited to, a charging and discharging measuring equipment. The battery charging and discharging apparatus includes a power source and plural charging and discharging modules for charging and discharging plural batteries respectively. Please refer to FIG. 2 which illustrates a schematic diagram of the battery charging and discharging apparatus.

Figure 1:
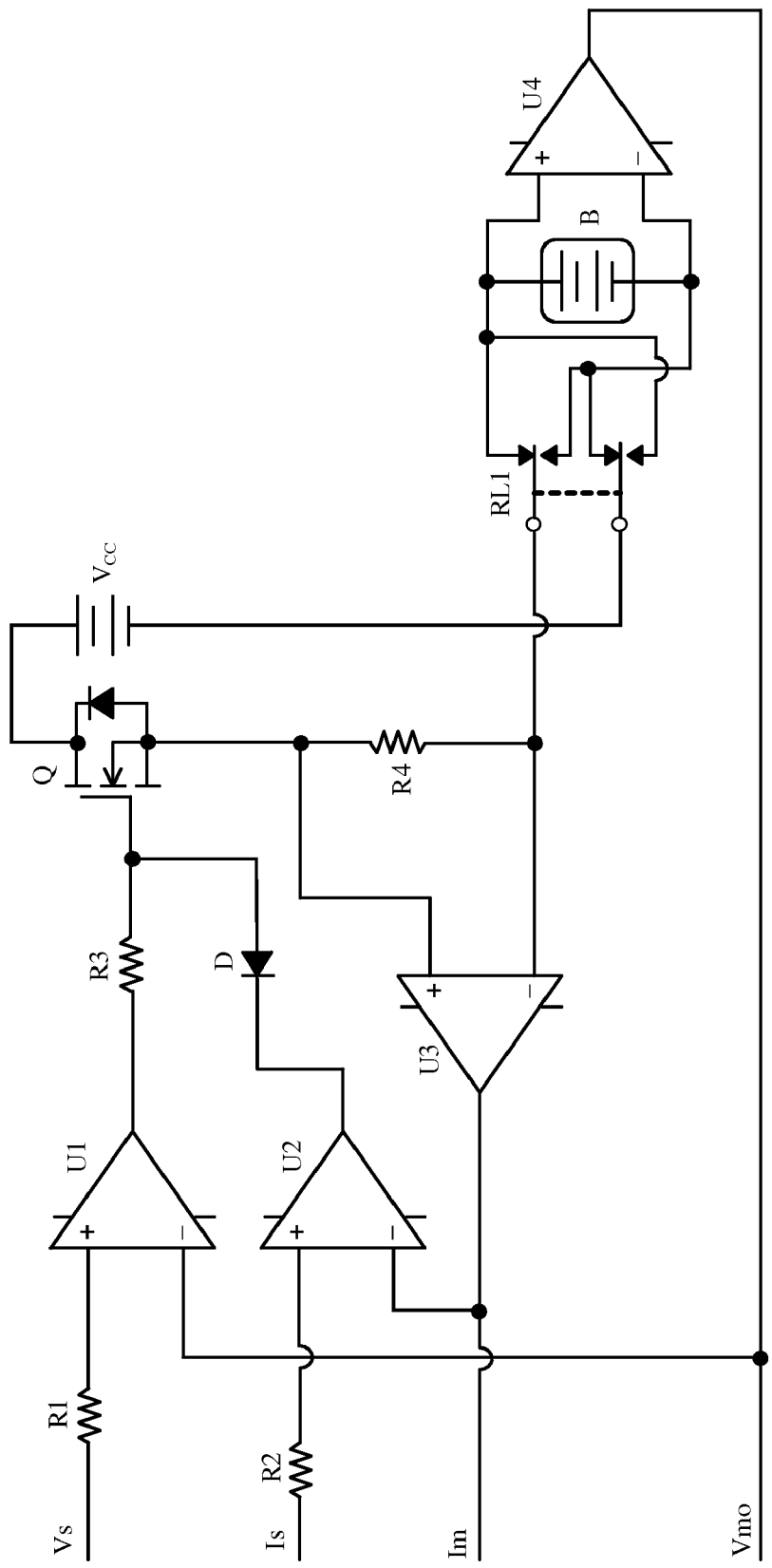
FIG. 1 illustrates a schematic diagram of a charging and discharging circuit of a traditional charging and discharging measuring equipment for charging of a battery.
Figure 2:
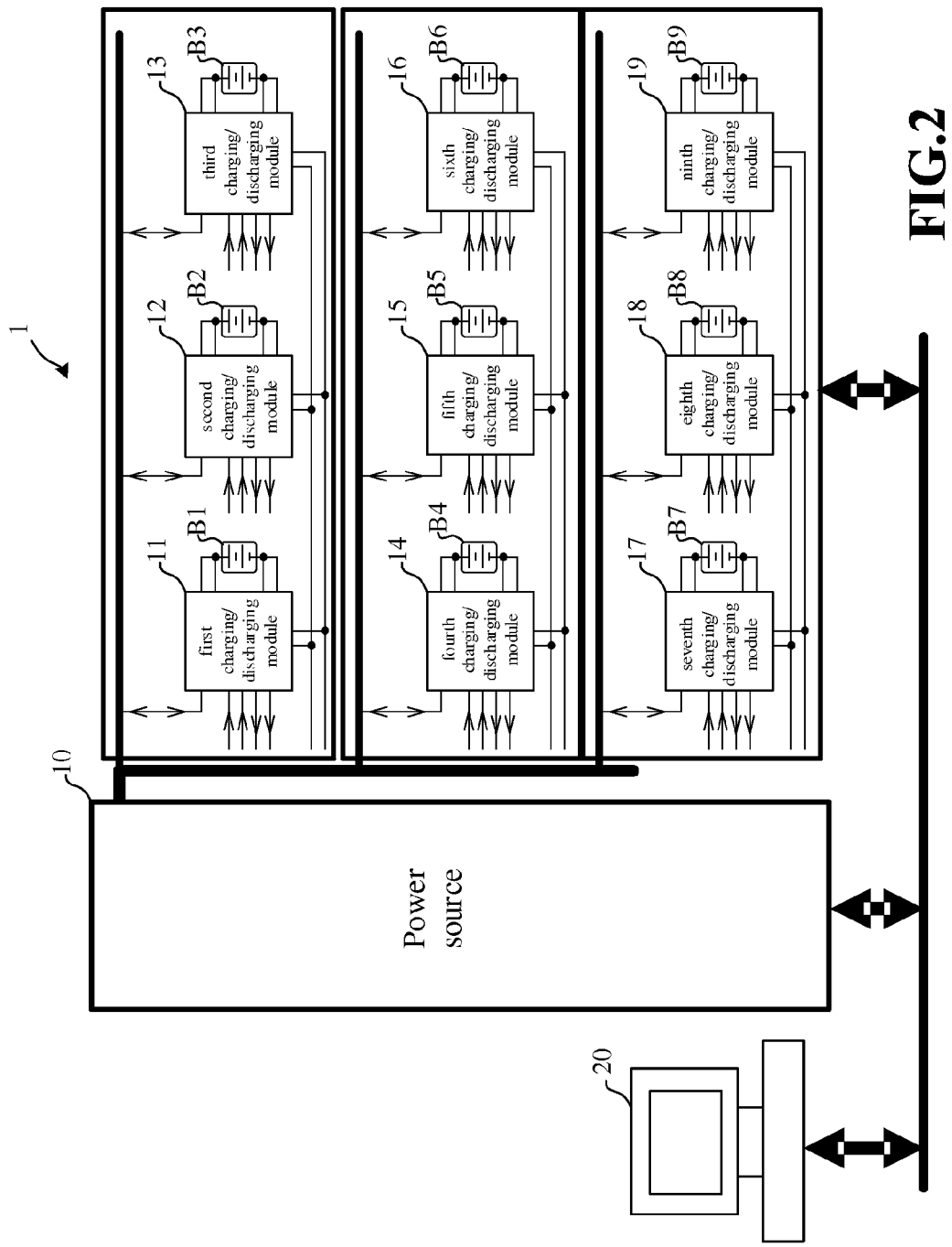
FIG. 2 illustrates a schematic diagram of a battery charging and discharging apparatus according to a first embodiment of the invention.

As shown in the embodiment of FIG. 2, the battery charging and discharging apparatus 1 includes a power source 10, a first charging and discharging module 11, a second charging and discharging module 12, a third charging and discharging module 13, a fourth charging and discharging module 14, a fifth charging and discharging module 15, a sixth charging and discharging module 16, a seventh charging and discharging module 17, a eighth charging and discharging module 18, a ninth charging and discharging module 19, and a control module 20. All the first to ninth charging and discharging modules (11~19) are coupled to the power source 10; the control module 20 is coupled to the power source 10 and all the first to ninth charging and discharging modules (11~19).

It should be noted that the first to ninth charging and discharging modules (11~19) are coupled to the first to ninth batteries (B1~B9) respectively; that is to say, each charging and discharging module in the battery charging and discharging apparatus 1 is able to charge and discharge one battery. Thus, the battery charging and discharging apparatus 1 in this embodiment is able to charge and discharge, but not limited to, a maximum of nine batteries at the same time. In fact, each of the first to ninth batteries (B1~B9) may be any type of rechargeable battery. Besides, there would be no restrictions to the batteries; for example, each battery may be composed of several cells coupled to each other.

Next, each module with a specific function contained in the battery charging and discharging apparatus 1 is explained in detail.

In this embodiment, the power source 10 is a DC power supply which supplies the battery charging and discharging apparatus 1 electricity not only for operation but also to charge and discharge the batteries.

The control module 20 is aimed at controlling the modules (11~19) to charge and discharge the batteries (B1~B9) and monitoring charging and discharging results of the batteries so as to evaluate whether one or multiple batteries among these under-test ones (B1~B9) have abnormal conditions on charging or discharging to make sure that the capacity of the produced battery can meet the required specification.

In the following, there are explanations for the first to ninth charging and discharging modules (11~19). It should be noted that since the modules (11~19) have the same structure, only the first charging and discharging module 11 is given as an example herein. Please refer to FIG. 3 which illustrates a schematic diagram of a detailed circuit of the first charging and discharging module 11 during charging of the first battery B1.

Figure 3:
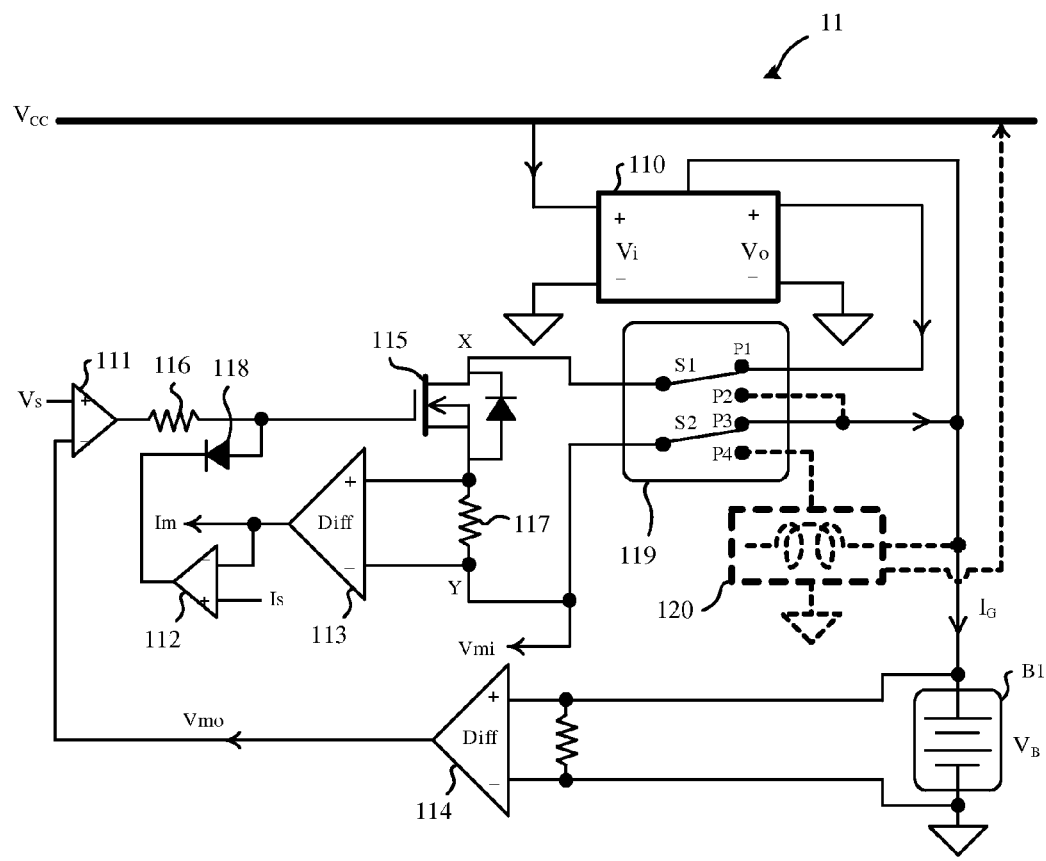
FIG. 3 illustrates a schematic diagram of a detailed circuit of a first charging and discharging module in FIG. 2 during charging of a first battery.

As shown in FIG. 3, the first charging and discharging module 11 includes a charging controlling unit 110, a constant voltage control unit 111, a constant current control unit 112, a current readback amplifying unit 113, a voltage readback amplifying unit 114, a current-limiting transistor 115, a constant voltage resistor 116, a current-limiting resistor 117, a diode 118, a switch unit 119, and a discharging controlling unit 120. The current-limiting transistor 115 and the current-limiting resistor 117 are connected in series. The charging controlling unit 110 is coupled to the switch unit 119 and the first battery B1 and receives the voltage Vcc provide by the power source 10 through the power line. The constant voltage control unit 111 is coupled to the voltage readback amplifying unit 114 and the constant voltage resistor 116. The constant current control unit 112 is coupled to the current readback amplifying unit 113 and the diode 118. The current readback amplifying unit 113 is coupled between the current-limiting resistor 117 and the current-limiting transistor 115 and coupled to the switch unit 119. The voltage readback amplifying unit 114 is coupled to the positive and negative ends of the first battery B1. Both the current readback amplifying unit 113 and the voltage readback amplifying unit 114 are differential amplifiers. The constant voltage resistor 116 is coupled to the current-limiting transistor 115 and the diode 118. The diode 118 is coupled between the current-limiting transistor 115 and the constant voltage resistor 116 and coupled to the constant current control unit 112. The switch unit 119 is coupled to the charging controlling unit 110, the current-limiting transistor 115 and the current-limiting resistor 117.

In this embodiment, Vs is the maximum charging voltage, e.g. 4.2 volt, for the first battery B1. Is is the maximum charging current, e.g. 1.8 ampere, for the first battery B1. IG is the charging current for the first battery B1. Vi is the voltage at the input end of the charging controlling unit 110, while Vo is the voltage at the output end of the charging controlling unit 110. VB is the voltage of the first battery B1.

It should be noted that since the discharging controlling unit 120 does not cooperate with the first charging and discharging module 11 to charge the first battery B1 in FIG. 3, the discharging controlling unit 120 is marked in the dotted line.

Traditionally, because the charging and discharging measuring equipment uses the voltage-fixed circuit to charge batteries, heat loss of the current-limiting transistor in the circuit is usually too high. Differently, the charging controlling unit 110 in the first charging and discharging module 11 of the invention is of a battery voltage tracking (BVT) type. When the first battery B1 is still in the uncharged state in the beginning of charging, the first charging and discharging module 11 operates in a current-limiting mode, and the constant current control unit 112 is responsible for the control of constant current in the charging circuit. As soon as the charging current IG is less than the maximum charging current Is after a period of time for the current-limiting mode, the first charging and discharging module 11 automatically switches to a voltage-limiting mode to charge the battery, and the constant voltage control unit 111 is now responsible for the control of constant voltage in the charging circuit.

It should be noted that because the first switch S1 and the second switch S2 of the switch unit 119 connect node P1 and node P3 respectively in the beginning of charging, the charging controlling unit 110 is able to be coupled to the X node and Y node in the charging circuit, i.e. two ends of the current-limiting transistor 115 and the current-limiting resistor 117 connected in series. Thereby, the voltage $V_{XY}$ across two ends of the current-limiting transistor 115 and the current-limiting resistor 117 connected in series is limited to a fixed value (e.g. 0.5 volt) by the charging controlling unit 110 to prevent too much heat loss arising from the current-limiting transistor 115 in the beginning of constant current charging for the first battery B1. Meanwhile, the voltage Vo at the output end of the charging controlling unit 110 equals the sum of the voltage VB and the fixed voltage value (e.g. 0.5 volt).

Figure 4:
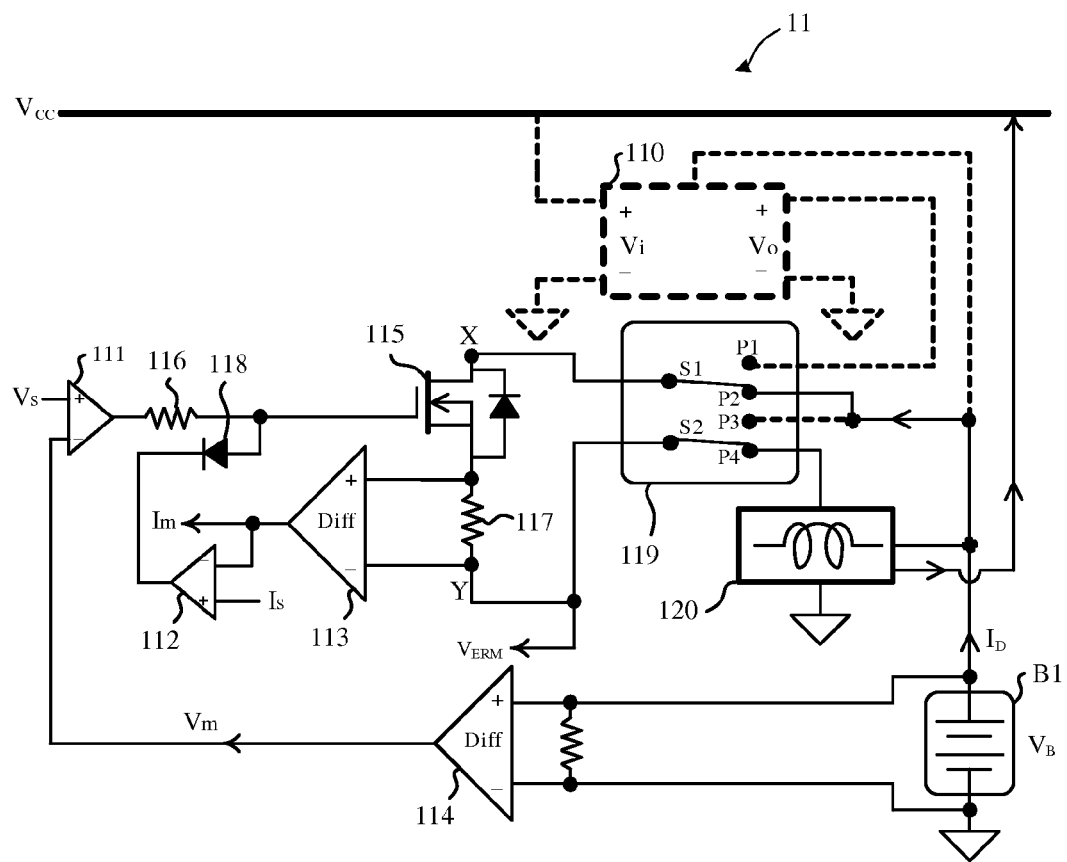
FIG. 4 illustrates a schematic diagram of a detailed circuit of the first charging and discharging module in FIG. 2 during discharging of the first battery.

Please refer to FIG. 4 which illustrates a schematic diagram of a detailed circuit of the first charging and discharging module 11 during discharging of the first battery B1. The difference between FIG. 3 and FIG. 4 is that since the charging controlling unit 110 does not participate in the operation of the whole discharging circuit, the charging controlling unit 110 is marked in the dotted line in FIG. 4; on the contrary, since the discharging controlling unit 120 does participate in the operation of the whole discharging circuit, the discharging controlling unit 120 is marked in the solid line in FIG. 4. In this embodiment, the discharging controlling unit 120 is of a battery voltage tracking type; Vcc is the voltage feedbacked to the power source 10; Vs is the maximum discharging voltage, e.g. 5 volt, of the first battery B1; Is is the maximum discharging current, e.g. 1.54 ampere, of the first battery B1; $I_D$ is the discharging current during discharging of the first battery B1.

When the first battery B1 begins discharging, the first charging and discharging module 11 keeps the current-limiting mode until the voltage $V_B$ of the first battery B1 is less than a default value, e.g. 3 volt. In practice, the default value may be set by the system or set by the user based on the practical demand.

It should be noted that as soon as the first battery B1 begins discharging, the first switch S1 and the second switch S2 of the switch unit 119 will switch to connect node P2 and node P4 respectively, so as to make the discharging controlling unit 120 coupled to the X node and Y node in the discharging circuit, i.e. two ends of the current-limiting transistor 115 and the current-limiting resistor 117 connected in series. Thereby, the voltage $V_{XY}$ across two ends of the current-limiting transistor 115 and the current-limiting resistor 117 connected in series is limited to a fixed value (e.g. 0.5 volt) by the discharging controlling unit 120 to prevent too much heat loss arising from the current-limiting transistor 115 during the constant current discharging of the first battery B1. Furthermore, the discharging controlling unit 120 is able to promote the node voltage $V_{ERM}$ to the level of Vcc, e.g. 15 volt.

Traditionally, because the charging and discharging measuring equipment converts the discharging energy of batteries into an alternating current and feedbacks it to the DC power system, it leads to the reduction of the electrical quality factor on the DC power system. Differently, the discharging controlling unit 120 in the first charging and discharging module 11 of the invention feedbacks the discharging energy from the first battery B1 to the direct-current (DC) power source 10. It not only meets the safety regulations for the recycling of discharging energy of batteries to provide the recycled electricity for the charging of other batteries, but also avoids the reduction of the electrical quality factor on the DC power source 10.

It is a battery charging method according to a second embodiment of the invention. In this embodiment, the battery charging method is implemented by charging a battery through a charging module which is of a battery voltage tracking type and includes a current-limiting transistor and a current-limiting resistor connected in series. Please refer to FIG. 3 regarding the detailed structure of the charging module, and descriptions are not repeated herein.

Figure 5:
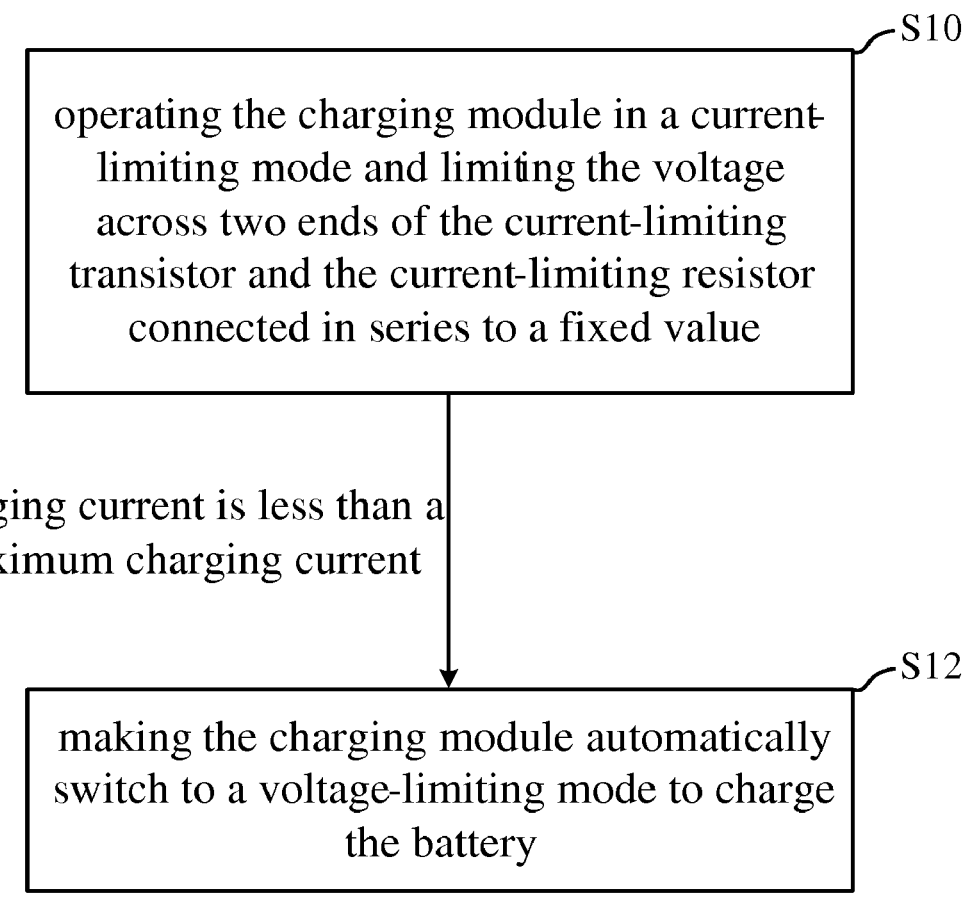
FIG. 5 illustrates a flow chart of a battery charging method according to a second embodiment of the invention.

Please refer to FIG. 5 which illustrates a flow chart of the battery charging method. As shown in FIG. 5, when the battery is still in the uncharged state in the beginning of charging activated by the charging module, step S10 in the method is executed to operate the charging module in a current-limiting mode and limit the voltage across two ends of the current-limiting transistor and the current-limiting resistor connected in series to a fixed value (e.g. 0.5 volt) to prevent too much heat loss arising from the current-limiting transistor in the beginning of constant current charging for the battery.

As soon as the charging current flowing into the battery is less than a maximum charging current after a period of time of the current-limiting mode, step S12 in the method is executed to make the charging module automatically switch to a voltage-limiting mode to charge the battery.

It is a battery discharging method according to a third embodiment of the invention. In this embodiment, the battery discharging method is implemented by controlling a battery to discharge through a discharging module which is of a battery voltage tracking type and includes a current-limiting transistor and a current-limiting resistor connected in series. Please refer to FIG. 4 regarding the detailed structure of the discharging module, and descriptions are not repeated herein.

Figure 6:
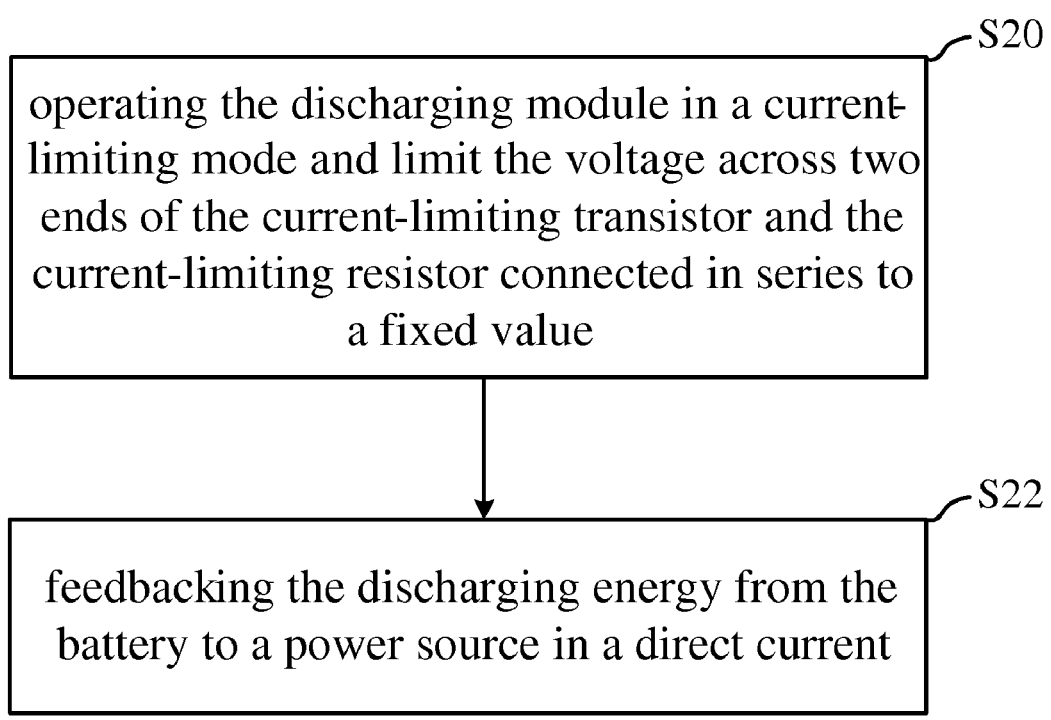
FIG. 6 illustrates a flow chart of a battery discharging method according to a third embodiment of the invention.

Please refer to FIG. 6 which illustrates a flow chart of the battery discharging method. As shown in FIG. 6, when the battery begins discharging, step S20 in the method is implemented to operate the discharging module in a current-limiting mode and limit the voltage across two ends of the current-limiting transistor and the current-limiting resistor connected in series to a fixed value (e.g. 0.5 volt) to prevent too much heat loss arising from the current-limiting transistor during discharging of the battery. In practice, during discharging of the battery, the discharging module keeps the current-limiting mode until the voltage of the battery is less than a default value.

In addition, step S22 in the method is also implemented to further feedback the discharging energy from the battery to a power source in a direct current, wherein the power source is a direct-current power supply for operation of the discharging module.

Compared to the prior art, the battery charging and discharging apparatus of the invention utilizes the charging controlling unit and the discharging controlling unit of battery voltage tracking types to limit the voltage across two ends of the current-limiting transistor and the current-limiting resistor connected in series to a fixed value to reduce heat loss arising from the current-limiting transistor during charging and discharging of the battery. Moreover, the battery charging and discharging apparatus of the invention is able to feedback the discharging energy from the battery to a DC power system in a direct current to supply the charging of other batteries. Thereby, the invention not only improves the efficiency of energy utilization, but also meets the safety regulations for the recycling of discharging energy of batteries to comply with the current trend of the environmental protection and energy conservation promoted globally With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A charging and discharging module coupled to a direct-current power source and a battery, the charging and discharging module comprising:
   a current-limiting transistor;
   a current-limiting resistor connected with the current-limiting transistor in series;
   a charging controlling unit coupled to the power source, the current-limiting transistor and the current-limiting resistor, when the charging and discharging module charges the battery, the voltage across two ends of the current-limiting transistor and the current-limiting resistor connected in series is limited to a first fixed value by the charging controlling unit; and
   a discharging controlling unit coupled to the power source, the current-limiting transistor and the current-limiting resistor, when the charging and discharging module discharges the battery, the voltage across two ends of the current-limiting transistor and the current-limiting resistor connected in series is limited to a second fixed value by the discharging controlling unit, and the discharging controlling unit feedbacks the discharging energy from the battery to the power source in a direct current.

2. The module of claim 1, wherein the charging controlling unit is of a battery voltage tracking type.

3. The module of claim 1, wherein the discharging controlling unit is of a battery voltage tracking type.

4. The module of claim 1, further comprising: a constant voltage control unit;
   a constant current control unit;
   a current readback amplifying unit coupled to the constant current control unit, the current-limiting transistor and the current-limiting resistor; and
   a voltage readback amplifying unit coupled to the constant voltage control unit, the battery, the charging controlling unit and the discharging controlling unit.

5. The module of claim 4, wherein when the charging and discharging module starts charging the battery in a current-limiting mode, the constant current control unit is responsible for the control of constant current; as soon as the charging current is less than a maximum charging current after a period of time of the current-limiting mode, the charging and discharging module automatically switches to a voltage-limiting mode to charge the battery, and the constant voltage control unit is responsible for the control of constant voltage.

6. The module of claim 4, wherein when the battery discharges, the constant current control unit keeps the current-limiting mode until the voltage of the battery is less than a default value.

7. A charging and discharging module coupled to a direct-current power source and a battery, the charging and discharging module comprising:
   a current-limiting transistor;
   a current-limiting resistor connected with the current-limiting transistor in series; and
   a discharging controlling unit coupled to the power source, the current-limiting transistor and the current-limiting resistor, when the charging and discharging module discharges the battery, the voltage across two ends of the current-limiting transistor and the current-limiting resistor connected in series is limited to a fixed value by the discharging controlling unit, the discharging controlling unit feedbacks the discharging energy from the battery to the power source in a direct current.

8. The module of claim 7, wherein the discharging controlling unit is of a battery voltage tracking type.

9. A battery charging and discharging apparatus comprising:
   a direct-current power source; and
   plural charging and discharging modules coupled to the power source, one of the plural modules being coupled to a battery and comprising:
   a current-limiting transistor;
   a current-limiting resistor connected with the current-limiting transistor in series;
   a charging controlling unit coupled to the power source, the current-limiting transistor and the current-limiting resistor, when the charging and discharging module charges the battery, the voltage across two ends of the current-limiting transistor and the current-limiting resistor connected in series is limited to a first fixed value by the charging controlling unit; and
   a discharging controlling unit coupled to the power source, the current-limiting transistor and the current-limiting resistor, when the charging and discharging module discharges the battery, the voltage across two ends of the current-limiting transistor and the current-limiting resistor connected in series is limited to a second fixed value by the discharging controlling unit, and the discharging controlling unit feedbacks the discharging energy from the battery to the power source in a direct current.

10. The apparatus of claim 9, wherein the charging and discharging module further comprises:
    a constant voltage control unit;
    a constant current control unit;
    a current readback amplifying unit coupled to the constant current control unit, the current-limiting transistor and the current-limiting resistor; and
    a voltage readback amplifying unit coupled to the constant voltage control unit, the battery, the charging controlling unit and the discharging controlling unit.

11. The apparatus of claim 10, wherein when the charging and discharging module starts charging the battery in a current-limiting mode, the constant current control unit is responsible for the control of constant current; as soon as the charging current is less than a maximum charging current after a period of time of the current-limiting mode, the charging and discharging module automatically switches to a voltage-limiting mode to charge the battery, and the constant voltage control unit is responsible for the control of constant voltage.

12. The apparatus of claim 10, wherein when the battery discharges, the constant current control unit keeps the current-limiting mode until the voltage of the battery is less than a default value.

13. The apparatus of claim 9, further comprising:
    a control module, coupled to the power source and the plural charging and discharging modules, for controlling the plural charging and discharging modules to charge and discharge plural batteries and monitoring charging and discharging results of the plural batteries.

14. A battery charging and discharging apparatus comprising:
- a direct-current power source; and
- plural charging and discharging modules coupled to the power source, one of the plural modules being coupled to a battery and comprising:
  - a current-limiting transistor;
  - a current-limiting resistor connected with the current-limiting transistor in series; and
  - a discharging controlling unit coupled to the power source, the current-limiting transistor and the current-limiting resistor, when the charging and discharging module discharges the battery, the voltage across two ends of the current-limiting transistor and the current-limiting resistor connected in series is limited to a fixed value by the discharging controlling unit, the discharging controlling unit feedbacks the discharging energy from the battery to the power source in a direct current.

15. A method for charging and discharging a battery through a charging and discharging module which is of a battery voltage tracking type and comprises a current-limiting transistor and a current-limiting resistor connected in series, the method comprising the following step:
- limiting the voltage across two ends of the current-limiting transistor and the current-limiting resistor connected in series to a first fixed value when the charging and discharging module charges the battery, wherein the charging and discharging module charges the battery in a current-limiting mode at the beginning; as soon as the charging current is less than a maximum charging current after a period of time, the charging and discharging module automatically switching to a voltage-limiting mode to charge the battery;
- limiting the voltage across two ends of the current-limiting transistor and the current-limiting resistor connected in series to a second fixed value when the charging and discharging module discharges the battery, wherein the charging and discharging module keeps a current-limiting mode until the voltage of the battery is less than a default value; and
- feedbacking the discharging energy from the battery to a power source in a direct current, and the power source being a direct-current power supply.

* * * * *